No. 828,484. PATENTED AUG. 14, 1906.
W. KEENAN & B. C. GILLIGAN.
PASTE GLASS MOLD.
APPLICATION FILED DEC. 26, 1905.
5 SHEETS—SHEET 5.
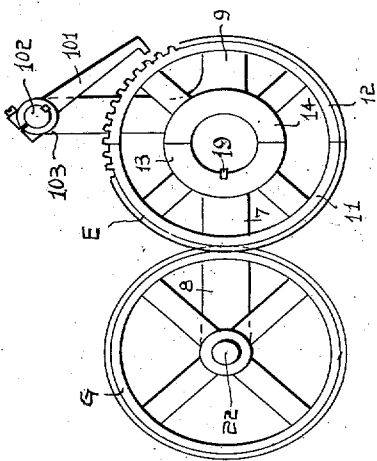
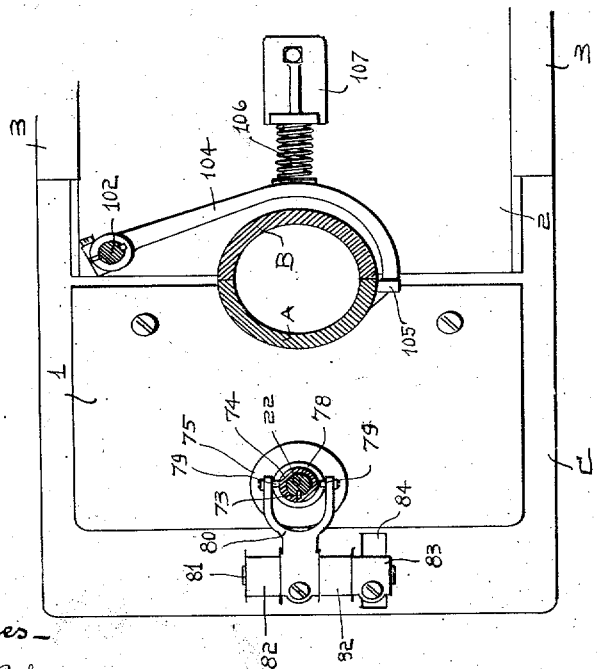

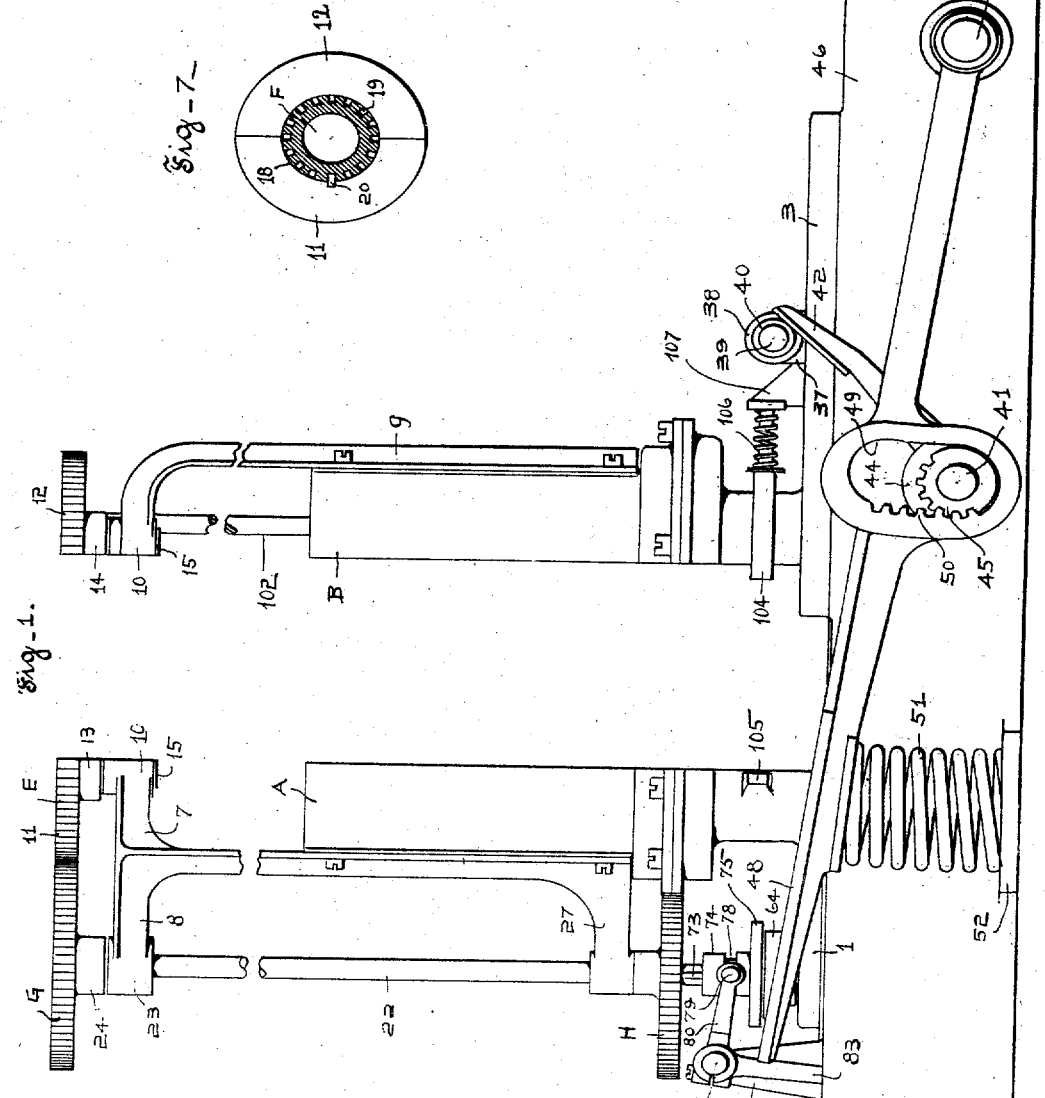

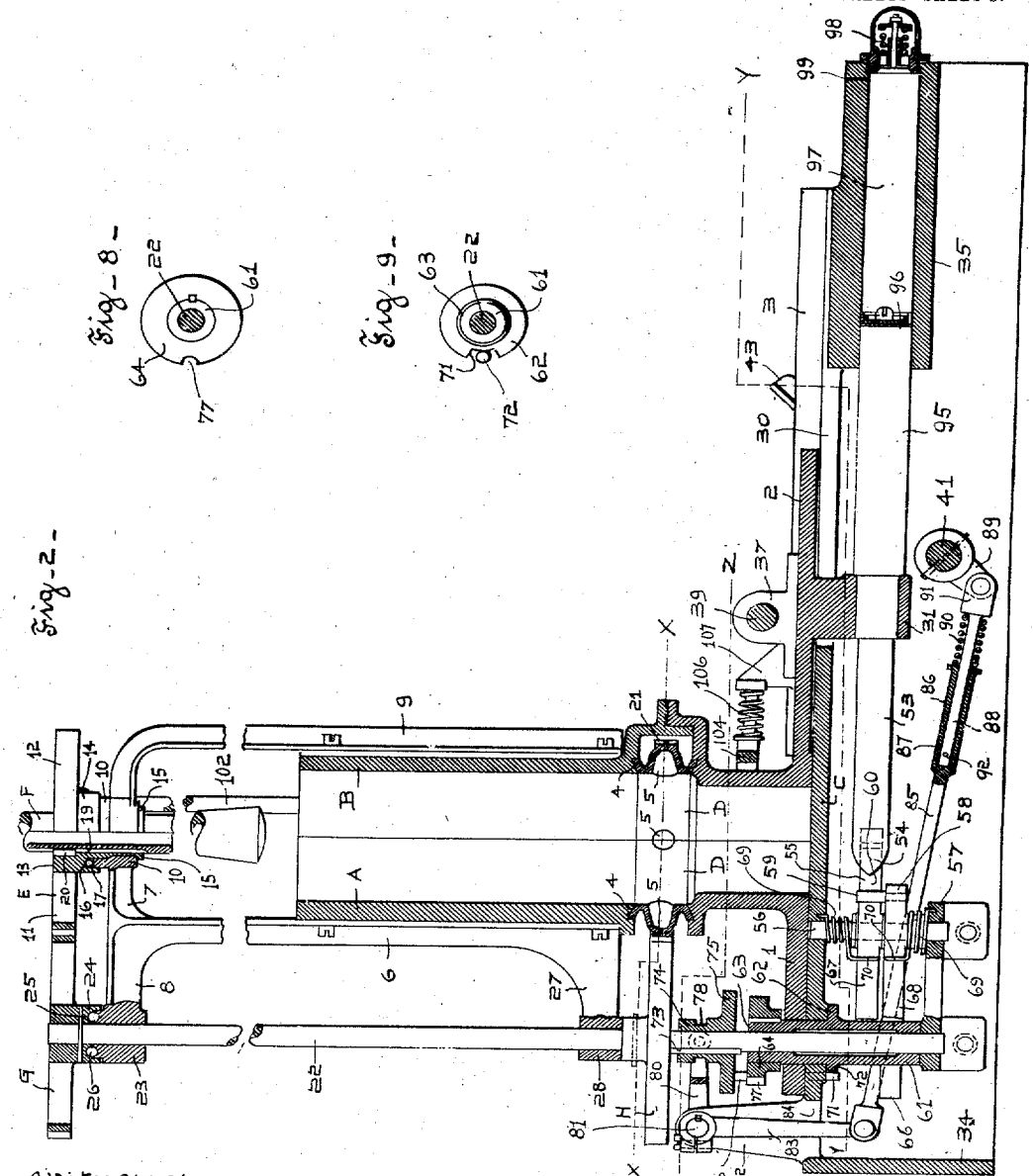

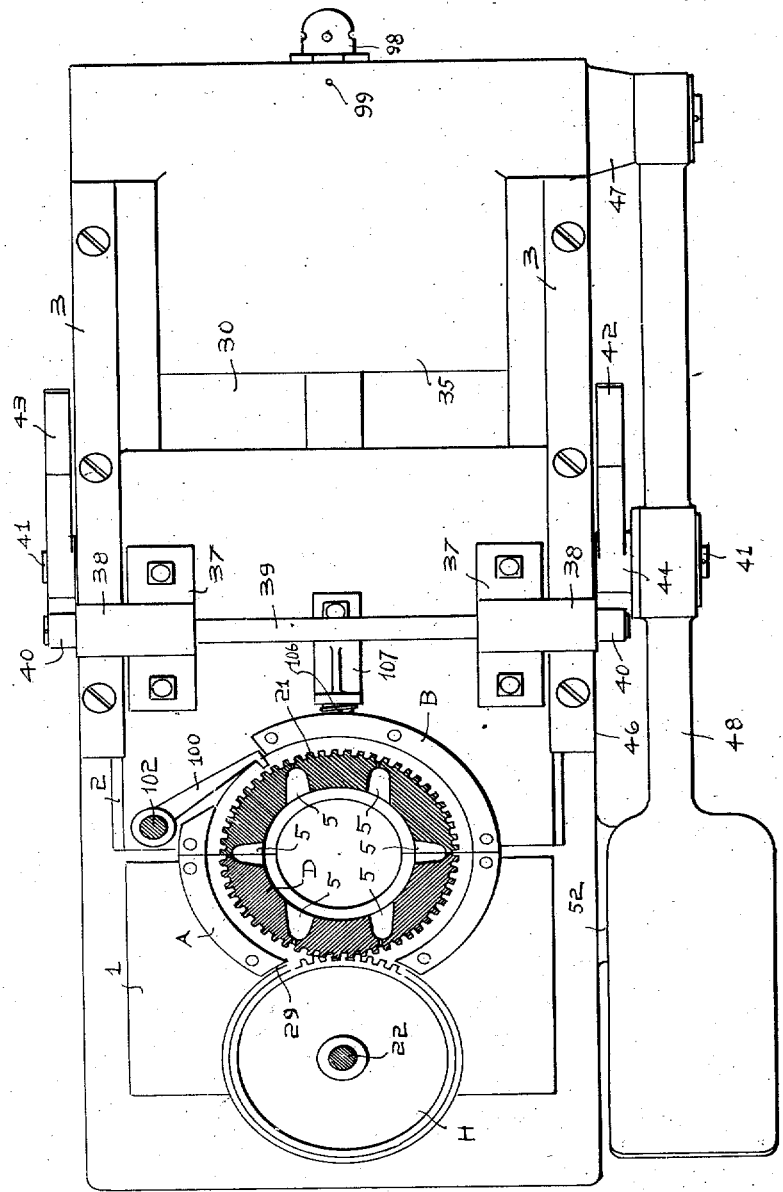

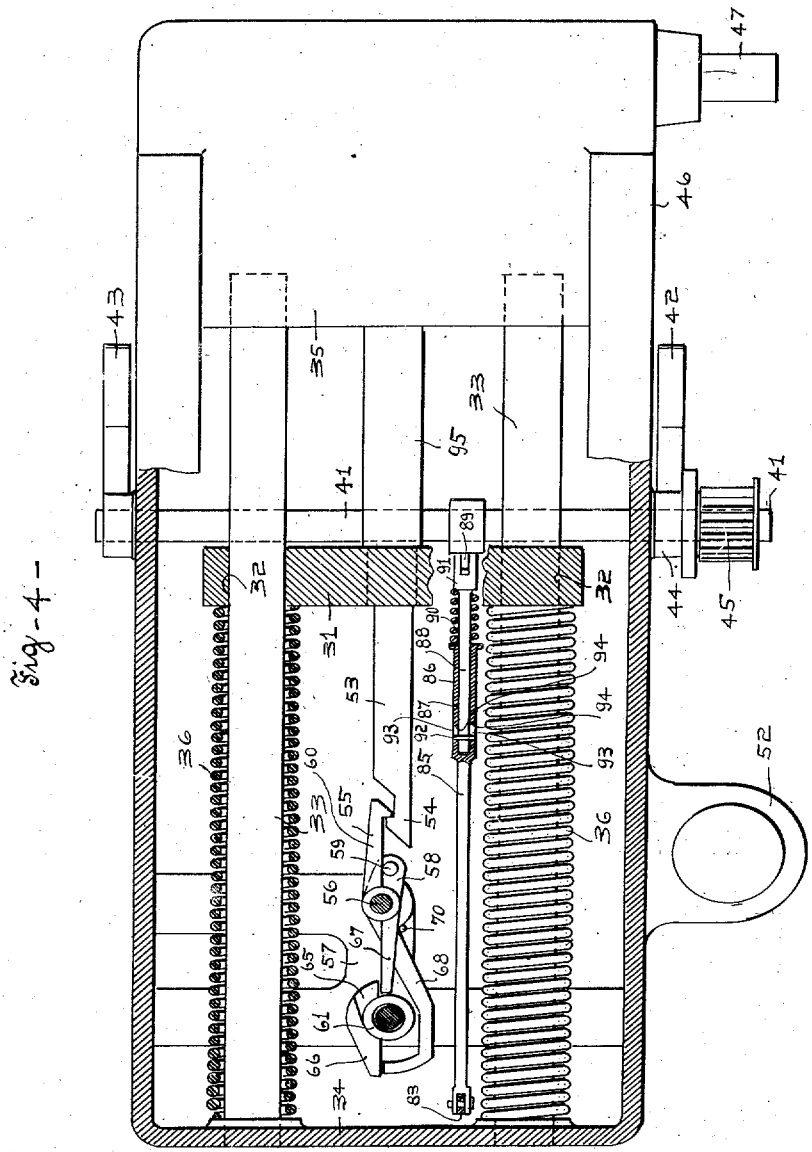

UNITED STATES PATENT OFFICE.

WILLIAM KEENAN AND BERNARD C. GILLIGAN, OF TOLEDO, OHIO.

PASTE-GLASS MOLD.

No. 828,484.    Specification of Letters Patent.    Patented Aug. 14, 1906.

Application filed December 26, 1905. Serial No. 293,307.

*To all whom it may concern:*

Be it known that we, WILLIAM KEENAN and BERNARD C. GILLIGAN, citizens of the United States, residing at Toledo, in the county of Lucas and State of Ohio, have invented a new and useful Paste-Glass Mold, of which the following is a specification.

Our invention relates to a paste-glass mold, and has for its object to provide a mold of the kind which is adapted to facilitate the production of glassware having seamless polished portions and other portions studded with protuberances.

The objects of our invention are accomplished as hereinafter described, and illustrated in the drawings, in which—

Figure 1 is a side elevation of a mold constructed in accordance with our invention opened to receive either a glass-blank or permitting the removal of glassware blown therein. Fig. 2 is a longitudinal section of the mold in the closed position with the foot-lever released and the opening trip mechanism in position to release on further movement the spring-pressed slidable mold-section. Fig. 3 is a section on line X X of Fig. 2, showing the mold closed. Fig. 4 is a section on line Y Y of Fig. 2, showing the lock-rod of the movable mold-section engaged by the locking-dog and the opening-springs in compression. Fig. 5 is a section and part plan on line Z Z of Fig. 2, showing the operating-yoke for the opening trip and the spring-pressed operating-arm for the spur-gear locking-dogs. Fig. 6 is a top plan view of the blowpipe gear-wheel sections brought together on closing the mold and showing the locking-dog disengaged to permit turning of the gear-sections. Fig. 7 is a partial plan view of the blowpipe gear-hub closed around the blowpipe, which is shown in section. Fig. 8 is a plan view of the cam-sleeve disk, and Fig. 9 is a like view showing the stop-pin arranged to limit the rotative movement of the cam-sleeve.

A and B are semimold-sections forming together a complete mold. The mold-faces of each section are coated with ground cork or cherry-wood, burned to the metal composing the sections to form a lining for the mold in which glass is turned during blowing to polish it and obliterate mold-seams.

The mold-sections A and B are each provided with a foot-plate 1 and 2, respectively. The mold-section A is fixed to one end of an oblong base C by having its foot 1 suitably secured to the top of the base. The mold-section B is slidably mounted upon the other portion of the base by having its foot 2 so shaped as to permit travel upon the base between dovetail gibs 3, which are fixed to the base C, one at each side of the foot 2.

The mold-sections A and B are further formed with a dovetail recess 4, adapted to rotatively receive an iron mold-section D in the form of an annulus, also partible with the lined mold-sections A and B and turnable with the rotated glassware.

In the body of each semi-annulus are formed a plurality of vented sockets 5, which are adapted, by reason of the annulus turning with the glassware, to form integral unpolished protuberances on the mold-polished glassware blown in the mold and which are alined to permit the separation of mold-sections for ready removal of the glassware when the parting-line of the annulus coincides with the parting-line of the mold-sections.

To the side of the mold-section A there is secured a bracket-arm 6, extending a suitable distance above the top of the mold and having a cross-arm 7 extending toward the center of the mold and an arm 8 of equal length extending in the opposite direction. A like bracket-arm 9 is secured to the mold-section B, extending likewise above the mold and being curved toward the center of the mold in the plane with the arm 7. At the ends of these arms are located bosses, each being formed as a semibearing 10, also partible with the mold-sections.

A spur gear-wheel E, comprising semisections 11 and 12, having semihubs 13 and 14, respectively, is journaled in the semibearing 10, each hub-section being provided with a lip 15, adapted to engage the under side of the respective bearing 10 to lock their respective wheel-sections against perpendicular displacement. Each hub-section is also provided with a semi-annular groove 16, adapted to receive the top of its respective semibearings to prevent sidewise displacement of the wheel-sections and form a channel for the ball-bearings 17. The sectional hub of the gear-wheel E is formed with a bore 18, adapted to receive the blowpipe F, which is provided with radial grooves 19, adapted to receive a spline 20, extending from one or both of the hub-sections to engage the spur-wheel with the pipe for turning when the mold is closed. The rim of the semisectional annulus is formed with gear-teeth 21, the pitch diameter of which determines the pitch diameter of the semisectional spur gear-wheel E, which meshes with a spur gear-wheel G of equal diameter. The latter is fixed to the top end of a vertical shaft 22, which is stepped in a bearing 23, formed at the end of arm 8. The hub 24 of this gear-wheel is also provided with an annular groove 25, adapted to receive the top of the hub and form conjointly therewith a channel for the step ball-bearings 26.

From the bottom of the bracket 6 extends an integral arm 27, at the end of which a bearing 28 is formed for the shaft 22, and under this bearing there is fixed to the shaft a spur gear-wheel H, the teeth of which are in mesh with the teeth 21 of the semisectional annulus D, the mold-section A being formed with an incut 29, which intercepts the recess 4 to permit such meshing.

The base C is formed with a slot 30, permitting the extension under the top of the base of a depending shoulder 31, integral with the foot 2, being arranged crosswise of the foot of the movable mold-section. Near each end of the shoulder 31 and under the top of the base are formed suitable bores 32, through which parallel rods 33 are projected. The ends of these rods, which are in line with travel of the movable mold-section, are respectively secured in the ends 34 and 35 of the base C and serve as guides for the springs 36, which are mounted on each rod between the shoulder 31 and the end 34 of the base, said springs being compressed by the closing movement of the mold.

To the top of the foot 2 are secured brackets 37, each forming a hub 38, arranged to overhang the respective sides of the foot 2. These hubs are bored to receive crosswise of the foot a rod 39, having a roller 40 journaled thereon at each end, in a position overhanging the respective sides of the base C.

Upon the projecting ends of a rock-shaft 41, which is journaled in the sides of the base, are mounted arms 42 and 43, adapted to contact with the rollers 40. The hub 44 of the arm 42 is extended and formed as a partial pinion 45.

The side 46 of the base is provided with stud 47, to which the operating foot-treadle 48 is pivoted. This treadle is formed with a slotted yoke 49, through which the partial pinion 45 is projected. By toothing the coincident side of the yoke as a rack 50 to mesh with the pinion, motion is transmitted to the rock-shaft by the movement of the treadle. The treadle is normally raised by a spring 51, interposed between the under side of the treadle and a plate 52, also extending from the side 46 of the base.

Parallel with the spring-rods 33 and centrally thereof there is secured to the shoulder 31 a locking-rod 53, the end of which is formed as a latch 54, adapted to be engaged by a locking-dog 55 at the end of the closing movement of the mold. The locking-dog 55 is pivoted upon a stud 56, having its top end let into the top of the base C and its bottom end held in a bracket-plate 57, which is secured to the side of the base. Between the locking-dog 55 and the top of the plate 57 there is interposed a lever 58, also pivoted upon the stud 56 and being provided with a pin 59, adapted to contact with the arm 60 of the locking-dog and move it out of engagement with the latch 54.

The shaft 22 is extended through the top of the base and also journaled in the bracket-plate 57 to form a pivot for a sleeve 61. This sleeve is supported upon the plate 57 and is shouldered by an integral flange 62 against the under side of the top of the base and also has a portion 63, which extends a suitable distance above the top of the foot 1 of the fixed mold-section A to receive thereon a fixed disk 64. The sleeve is further provided with cams 65 and 66, arranged in separate planes at opposite sides of the sleeve to respectively contact with the lever-arms 67 and 68, respectively integral with the locking-dog 55 and the lever-arm 60. The end lever-arms 67 and 68 are each pressed against their respective cams by means of springs 69, each having a free end 70 arranged to contact with the respective lever-arms 67 and 68.

The rim of the flange 62 is formed with a notch 71, into the area of which a pin 72 depends from the under side of the top of the base, being adapted to contact with the sides of the notch 71 to limit other movement of the sleeve but that required in either direction to disengage the locking-dog from the latch.

Between the disk 64 and the gear-wheel H the shaft 22 is provided with a spline 73, adapted to rotatively engage a collar 74, which is slidably mounted upon this portion of the shaft. The collar 74 is provided at its bottom end with a flange 75, from the under side of which a pin 76 depends, adapted to engage a rim-notch 77 in the disk 64 when the collar is moved toward the disk 64. The collar 74 is also provided with a groove 78, into which the end pins 79 of a fork-lever arm 80 are projected to move the collar 74 against the disk 64 or away from it when the lever is rocked. The lever-arm 80 is fixed to an arbor 81, which is journaled in bearings 82, projected above the top of the mold-base C. To the arbor 81 there is also fixed a lever-arm 83, the end of which depends through a slot 84 some distance under the top of the base C. The connecting-rod section 85, which is coupled by one end of the lever-arm, has formed at its other end an enlarged socket 86, into the bore 87 of which is inserted the other rod-section 88. The extending end of the rod-section 88 is pivoted to a crank-arm 89, which is fixed to the rock-shaft 41. A spring 90 is mounted upon the rod-section 88 between its coupling-eye 91 and the socket of the rod-section 85, adapted to form a compressed rod, while permitting the full rocking movement of the crank-arm 89, the complete movement of the rod being resisted by the contact of the pin 76 with disk 64 at either side of the notch. When by the rotation of the collar 74 the pin 76 is brought into position permitting its entrance into the disk-notch, the compressed spring 90 will force it therein by elongating the rod, and thereby couple the sleeve to the collar for turning with the shaft in either direction, such turning being limited by the stop-pin 72.

The rod-sections 85 and 88 are coupled together by means of a pin 92, fixed to the inserted portion of rod-section 88 and with the ends projected into slots 93, formed in the socket portion of the rod-section 85, said slots being of suitable length to permit the insertion of the pin 76 into the disk-notch 77. When the shaft is rocked in the opposite direction, the spring elongates until the pin 92 contacts with the ends 94 of the slots 93, upon which the collar is raised to its top position on the splined portions of the shaft 22.

From the shoulder 31 the lock-rod 53 is rearwardly extended as a plunger 95, the packed end 96 of which is inserted in a bore 97, formed in the end 35 of the base C. An outlet check-valve 98, fixed to the opposite end of this bore, permits ingress of air into the bore when the plunger is moved outward upon closing of the mold. Upon opening of the mold by pressure of the springs 36 the indrawn air acts as a check against shock, the air being permitted to slowly escape through a leakage-port 99 during such opening.

To positively preserve the parting alinement of the semigear and demisections of the annulus of the movable mold-section B, we have provided locking-dogs 100 and 101, respectively adapted to engage the teeth of said parts when the mold is open. These dogs are fixed in their respective positions to a shaft 102, stepped in the foot 2 near the parting-line of the mold and having its top end journaled in bearing 103, which is formed at the end of an arm extending integrally from the bracket 9.

A curved lever 104, fixed to the shaft, is arranged by contacting with lug 105 on the fixed section A to disengage both dogs from their locking position when the mold is in the closed position; but when the mold is opened by moving mold-section B away from mold-section A the dogs are forced into engagement with the teeth of both the semigear and the annulus by a spring 106, abutting against the lever-arm 104, and a stop 107, which is secured to the top of the movable mold-foot 2.

The operation of a mold thus constructed is as follows: A glass-blower, having marvered-glass blank at the end of a grooved blowpipe F, inserts the same between the opened mold, then presses upon the foot-lever 48 to close the mold, lock it in the closed position, with the spline 20 of the sectional gear H engaging the pipe. By thus closing the mold the sliding sleeve 74 is disengaged from the notch 72 of the cam-sleeve 61, as well as the locking-dogs 100 and 101, from engagements with the teeth of the annulus-section D and the wheel-section 12, thereby permitting the annulus being turned unresistingly in either direction with the blowpipe, said turning of the annulus being only unrestricted as long as the foot-treadle remains depressed, upon the release of which the spring returns the foot-lever into the normal raised position. By thus reversing the motion of the rock-shaft 41 the rod-sections 85 and 88 are compressed and yieldingly urge the collar 74, bearing the pin 76, into engagement with the cam-sleeve 61, upon which further motion in either direction will locate the pin 76 within the notch 77 and couple the cam-sleeve to the shaft 22. This being accomplished, a further slight motion in either direction will rotate the cam-sleeve and disengage the locking-dog, either through the arm 67 or the arm 68, the release of the locking-dog being only possible when the parting-lines of the mold-sections, the annulus, the clutch-gear E are coincident. Upon the release of the locking-latch the springs force the movable mold-sections away from the fixed mold-sections, which motion is resiliently arrested by the check. As the mold-sections are separating, the curved lever 104 being freed of the lug 105 the locking-dogs 100 and 101 respectively engage the gear-section 12 and the annulus-section D and prevent displacement of the same. The locking-dog 55 being spring-pressed also returns into the engaging friction and disposes the cam-sleeve 61, slot 71, centrally of the stop-pin 72. When the mold is thus opened, the blown glassware may be readily removed and the operation repeated.

What we claim is—

1. In a paste-mold for glassware comprising partible mold-sections, an annulus let into the mold-sections, being partible with the mold-sections, and having sockets and a gear-toothed rim, a blowpipe, means adapted to transmit unrestricted motion from the blowpipe to the annulus, comprising a partible blowpipe-clutch gear-wheel and idler-gearing arranged to respectively mesh with the clutch gear-wheel and the gear-toothed annulus.

2. In a paste-mold for glassware, a base, a semimold-section fixed to the base and a semimold-section slidable on the base, against or from the fixed mold-section, an annulus let into mold-sections being partible with the mold-sections and having sockets and a toothed rim, fixed struts extending above the mold, one from each mold-section, each strut having an arm extending toward the center of the mold and being each provided with a semibearing, a partible gear-wheel of a diameter equal to the diameter of the annulus, having hub-sections respectively journaled on said semibearing adapted to clutch a blowpipe, and a shaft stepped to the fixed mold-section provided with gears adapted to mesh with the partible gear-wheel and the partible annulus.

3. In a paste-mold for glassware, comprising a base-bearing, a fixed mold-section and a mold-section movable thereon, and having springs housed within adapted to urge the movable mold-section away from the fixed mold-section and being provided with a foot-lever adapted to close the movable mold-section against the fixed mold-section, a rim-toothed annulus, having sockets let into the mold-sections and being partible therewith, a blowpipe, means adapted to unrestrictively drive the annulus from the turnable blowpipe comprising a gear partible with the mold-section, having a bored hub arranged to receive and engage the blowpipe, and an idler-shaft, having gears arranged to respectively mesh with the blowpipe-gear and the annulus.

4. In a paste-mold for glassware, comprising a base-bearing a fixed mold-section and a mold-section movable thereon, and having springs housed within adapted to urge the movable mold-section away from the fixed mold-section and being provided with a foot-lever adapted to close the movable mold-section against the fixed mold-section, a rim-toothed annulus, having sockets, let into the mold-sections and being partible therewith, a blowpipe, means adapted to unrestrictively drive the annulus from the turnable blowpipe comprising a gear partible with the mold-section, having a bored hub arranged to receive and engage the blowpipe, and an idler-shaft, having gears arranged to respectively mesh with the blowpipe-gear and the annulus, and a check arranged to ease the outward movement of the movable mold-section, comprising a cylinder formed in the base, a piston fixed to the movable mold-section and movably inserted into the cylinder, an outlet check-valve to the cylinder, and a leakage-port therefrom.

5. In a paste-mold for glassware, comprising a base bearing a fixed mold-section and a mold-section movable thereon, and having springs housed within adapted to urge the movable mold-section away from the fixed mold-section and being provided with a foot-lever adapted to close the movable mold-section against the fixed mold-section, a rim-toothed annulus, having sockets, let into the mold-sections and being partible therewith, a blowpipe, means adapted to unrestrictively drive the annulus from the turnable blowpipe comprising a gear partible with the mold-section, having a bored hub arranged to receive and engage the blowpipe, and an idler-shaft, having gears arranged to respectively mesh with the blowpipe-gear and annulus, and locking mechanism for the semigear-wheel and the semi-annulus of the movable mold-section, comprising a shaft stepped to the movable mold-section, having spring-pressed locking-dogs arranged to mesh with the teeth of the semigear and the annulus, when the mold-sections are separated, a trip-lug on the fixed mold-section and an arm fixed to said shaft adapted to release the locking-dogs by contacting with the trip-lug when the mold-sections are brought together.

6. In a paste-mold for glassware, comprising a base, having a fixed semimold-section and a semimold-section spring-pressed to open and foot-operated means to close the movable section, a catch fixed to the movable mold-section, a locking-dog pivoted to the base adapted to engage the clutch and receive the movable mold against the fixed mold-section, a semi-annulus section let into each mold-section, having sockets and gear toothed rims, a blowpipe, a partible clutch for the blowpipe and geared idler mechanism driven by the turning of the blowpipe and meshing with the semi-annulus sections and having means adapted to release the locking-dog for the mold-catch in either direction where the parting-line of the mold-sections, the annulus and the blowpipe clutch-gears are coincident and the foot-lever is released.

7. In a paste-mold for glassware, the base C bearing molds A and B, each having a semi-annulus section D let into their respective body portions, the blowpipe clutch-gear E, shaft 22 having mounted thereon respectively the driven gear-wheel G and the driving gear-wheel H, the latch-rod 53, the locking-dog 55, the opening and closing mechanism comprising respectively the springs 36, the foot-shaft 41, having closing-arms 42 and 43 and the pinion 45 and the rocked yoked foot-lever 48 and the latch-release mechanism, comprising the cam-sleeve 61, sliding collar 74, yoke-arm 80, lever 83 connecting rod-section 85 and 86 and the operating crank-arm 89.

8. In a mold for glassware, a base provided with a lengthwise off-center top opening, and having mounted thereon a fixed semimold-section and a slidable complementary mold-section, having ears overhanging the sides of the base and a shoulder depending through the base-opening, springs interposed between the shoulder and the end of the base bearing the fixed mold-section, a shaft pivoted to the sides of the base, having arms arranged to contact with the ears to close the mold and compress the springs, and a fixed pinion, a foot-lever, pivoted to the side of the base, normally spring-pressed upward and having a rack-yoke adapted to mesh with the pinion and move the arms to close the mold, when the foot-lever is depressed.

9. In a mold for glassware a base provided with a lengthwise off-center top opening and having mounted thereon a fixed semimold-section and a slidable complementary mold-section, having ears overhanging the sides of the base and a shoulder depending through the base-opening, springs interposed between the shoulder and the end of the base bearing the fixed mold-section, a shaft pivoted to the sides of the base, having arms arranged to contact with the ears to close the mold and compress the spring, and a fixed pinion, a foot-lever, pivoted to the side of the base, normally spring-pressed upward, and having a rack-yoke adapted to mesh with the pinion and move the arms to close the mold, when the foot-lever is depressed, and a check arranged to ease the spring-pressed opening of the mold, comprising a cylinder formed in the opposite end of the base, a piston fixed to the shoulder of the movable mold-section and movable in the cylinder, an inlet-valve to the cylinder, and a leakage-port.

In testimony whereof we have set our hands this 21st day of December, 1903.

WILLIAM KEENAN
BERNARD C. GILLIGAN.

Witnesses:
JACOB TREMBLAY,
HERMAN H. MARTIN.

---

It is hereby certified that in Letters Patent No. 828,484, issued August 14, 1906, upon the application of William Keenan and Bernard C. Gilligan, of Toledo, Ohio, for an improvement in "Paste-Glass Molds," an error appears in the printed specification requiring correction, as follows: In line 31, page 5, the date "21st day of December, 1903," should read *21st day of December, 1905;* and that the said Letters Patent should be read with this correction therein that the same may conform to the record of the case in the Patent Office.

Signed and sealed this 16th day of October, A. D., 1906.

[SEAL.]

F. I. ALLEN,
*Commissioner of Patents.* mold and compress the springs, and a fixed pinion, a foot-lever, pivoted to the side of the base, normally spring-pressed upward and having a rack-yoke adapted to mesh with the pinion and move the arms to close the mold, when the foot-lever is depressed.

9. In a mold for glassware a base provided with a lengthwise off-center top opening and having mounted thereon a fixed semimold-section and a slidable complementary mold-section, having ears overhanging the sides of the base and a shoulder depending through the base-opening, springs interposed between the shoulder and the end of the base bearing the fixed mold-section, a shaft pivoted to the sides of the base, having arms arranged to contact with the ears to close the mold and compress the spring, and a fixed pinion, a foot-lever, pivoted to the side of the base, normally spring-pressed upward, and having a rack-yoke adapted to mesh with the pinion and move the arms to close the mold, when the foot-lever is depressed, and a check arranged to ease the spring-pressed opening of the mold, comprising a cylinder formed in the opposite end of the base, a piston fixed to the shoulder of the movable mold-section and movable in the cylinder, an inlet-valve to the cylinder, and a leakage-port.

In testimony whereof we have set our hands this 21st day of December, 1903.

WILLIAM KEENAN
BERNARD C. GILLIGAN.

Witnesses:
JACOB TREMBLAY,
HERMAN H. MARTIN.

---

It is hereby certified that in Letters Patent No. 828,484, issued August 14, 1906, upon the application of William Keenan and Bernard C. Gilligan, of Toledo, Ohio, for an improvement in "Paste-Glass Molds," an error appears in the printed specification requiring correction, as follows: In line 31, page 5, the date "21st day of December, 1903," should read *21st day of December, 1905;* and that the said Letters Patent should be read with this correction therein that the same may conform to the record of the case in the Patent Office.

Signed and sealed this 16th day of October, A. D., 1906.

[SEAL.]

F. I. ALLEN,
*Commissioner of Patents.*

It is hereby certified that in Letters Patent No. 828,484, issued August 14, 1906, upon the application of William Keenan and Bernard C. Gilligan, of Toledo, Ohio, for an improvement in "Paste-Glass Molds," an error appears in the printed specification requiring correction, as follows: In line 31, page 5, the date "21st day of December, 1903," should read *21st day of December, 1905;* and that the said Letters Patent should be read with this correction therein that the same may conform to the record of the case in the Patent Office.

Signed and sealed this 16th day of October, A. D., 1906.

[SEAL.]

F. I. ALLEN,
*Commissioner of Patents.*